United States Patent
Qu et al.

(10) Patent No.: US 9,154,512 B2
(45) Date of Patent: Oct. 6, 2015

(54) TRANSPARENTLY PROXYING TRANSPORT PROTOCOL CONNECTIONS USING AN EXTERNAL SERVER

(75) Inventors: Diheng Qu, Santa Clara, CA (US); Nicholas Leavy, Paris (FR); Richard Fox, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1918 days.

(21) Appl. No.: 11/396,249

(22) Filed: Mar. 30, 2006
(Under 37 CFR 1.47)

(65) Prior Publication Data
US 2007/0233877 A1    Oct. 4, 2007

(51) Int. Cl.
G06F 15/173 (2006.01)
G06F 15/16 (2006.01)
H04L 29/06 (2006.01)
H04L 29/12 (2006.01)
H04L 29/08 (2006.01)

(52) U.S. Cl.
CPC .......... H04L 63/14 (2013.01); H04L 29/12377 (2013.01); H04L 29/12509 (2013.01); H04L 61/2517 (2013.01); H04L 61/2567 (2013.01); H04L 67/2814 (2013.01)

(58) Field of Classification Search
CPC ............... H04L 29/12377; H04L 61/2517; H04L 67/2814
USPC ......... 709/201, 202, 223, 227, 237, 238, 245, 709/246
See application file for complete search history.

(56) References Cited

U.S. PATENT DOCUMENTS

| | | | |
|---|---|---|---|
| 5,623,601 A * | 4/1997 | Vu | 726/12 |
| 5,905,872 A * | 5/1999 | DeSimone et al. | 709/245 |
| 6,101,549 A * | 8/2000 | Baugher et al. | 709/238 |
| 6,324,648 B1 * | 11/2001 | Grantges, Jr. | 726/12 |
| 6,389,419 B1 * | 5/2002 | Wong et al. | 709/245 |
| 6,466,985 B1 * | 10/2002 | Goyal et al. | 709/238 |
| 6,826,599 B1 * | 11/2004 | Shaffer et al. | 709/213 |
| 6,934,763 B2 * | 8/2005 | Kubota et al. | 709/245 |
| 7,010,608 B2 * | 3/2006 | Garg et al. | 709/229 |
| 7,016,973 B1 * | 3/2006 | Sibal et al. | 709/238 |
| 7,123,613 B1 * | 10/2006 | Chawla et al. | 370/389 |
| 7,190,668 B1 * | 3/2007 | Francis et al. | 370/229 |
| 7,400,582 B2 * | 7/2008 | Shaheen et al. | 370/231 |

(Continued)

OTHER PUBLICATIONS

Winett, Joel M.; The Definition of a Socket; May 7, 1971; Lincoln Laboratory; Request for Comment 147.*
eSe Security, "En.Gate Basic", Version 1.00, Conceptual White Paper, Sep. 2004, 10 pgs.

(Continued)

Primary Examiner — Madhu Woolcock
(74) Attorney, Agent, or Firm — Hickman Palermo Becker Bingham LLP

(57) ABSTRACT

Methods and apparatus are disclosed for processing data packets using a router and a proxy in order to transparently proxy a connection between a client and a server. One method involves mapping a TCP connection to a connection ID and sending a segment from the TCP connection to a proxy, including the connection ID, a direction value and an identifier of an assigned proxy application, such that the segment appears to be from the connection. The method further involves a proxy creating and reading from an IP socket which corresponds to the segment, the connection ID, direction and assigned proxy application and then spoofing the segment using the connection ID, a second direction value, and an identifier of the assigned proxy application.

29 Claims, 7 Drawing Sheets

(56) References Cited

U.S. PATENT DOCUMENTS

2003/0229809 A1* 12/2003 Wexler et al. ............... 713/201
2004/0243703 A1* 12/2004 Demmer et al. ............ 709/224
2007/0094411 A1* 4/2007 Mullane et al. ............. 709/245

OTHER PUBLICATIONS

Jonathan Hassell, "How Firewalls Work", located at http://www.connectedhomemag.com/HomeOffice/Articles/Index.cfm?ArticleID=22623, dated Jun. 14, 2001, 3 pgs.

* cited by examiner

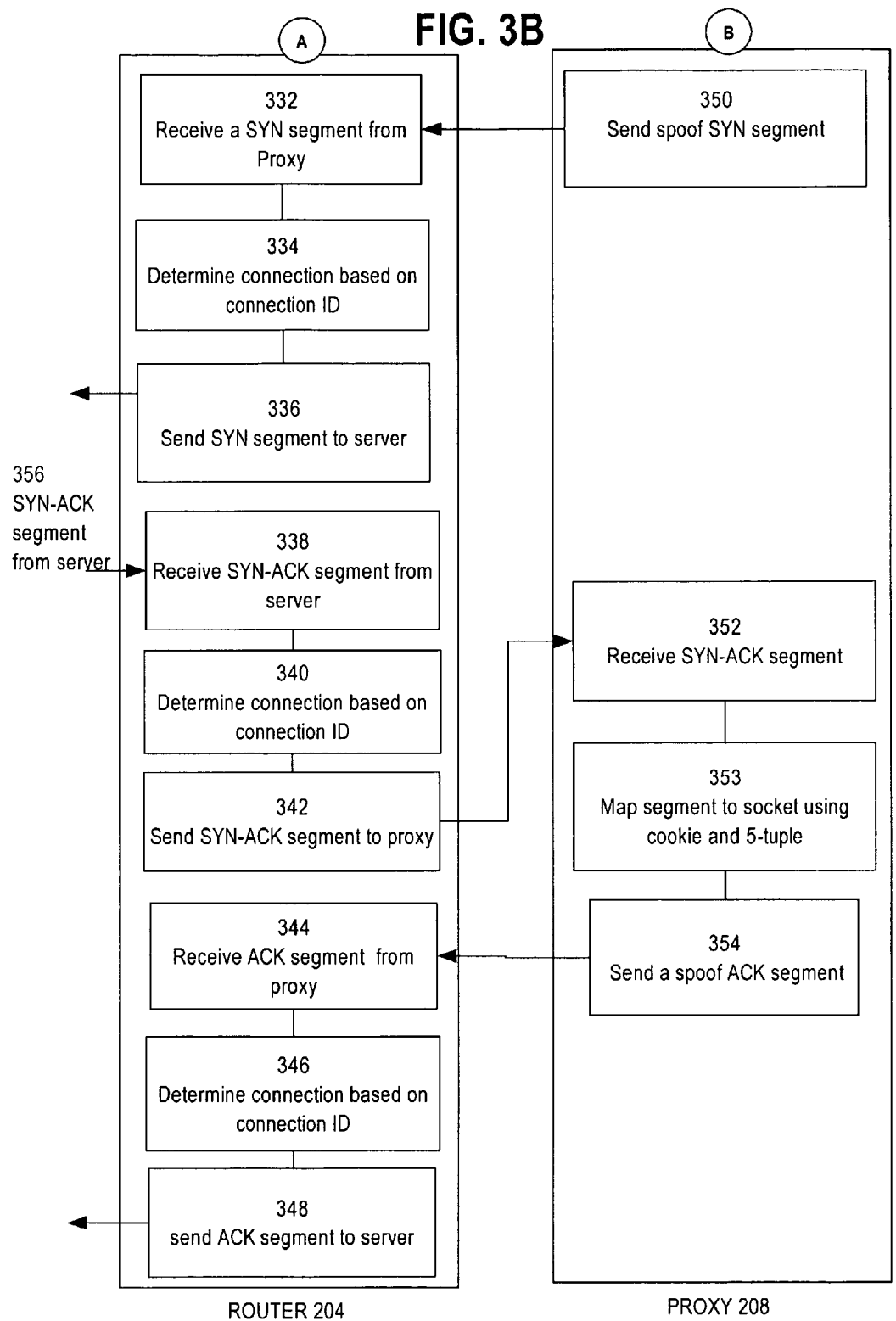

TRANSPARENTLY PROXYING TRANSPORT PROTOCOL CONNECTIONS USING AN EXTERNAL SERVER

FIELD OF THE INVENTION

The present invention generally relates to network data processing. More specifically, this invention relates to collaboration among a router and a proxy in a packet-switched network for transparently proxying connections.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Modern computer networks rely on routers, proxy devices, switches and other infrastructure elements that act as the intermediary devices that connect clients to a destination server. Clients establish connections to the intermediary, which then establishes a connection to the destination server. The intermediary device sends data received from the client to the destination server and forwards data received from the destination server to the client. The intermediary device acts as both a server and a client. It is a server to its client and a client to its destination server.

FIG. 1A illustrates a network using proxy 102 as an intermediary between clients 104, 106 and server 108. Proxy 102 can be configured to perform a variety of functions before sending a segment of data to the server 108; such functions include, for example, Network Address Translation, Firewall protection or executing a software application to perform an operation on data carried in the segment.

In a typical network implementation, the proxy 102 has one connection to clients 104, 106 and another connection to the server 108. When client 104 sends a request, proxy 102 forwards the request on to the server 108 after the proxy 102 performs its intended function. Similarly, the response from server 108 is sent to proxy 102, and is forwarded back to the client 104. A client 104 may have explicit configuration identifying which proxy it should use. The proxy 102 uses its own network address when connecting to the server.

When a proxy has been configured to function as an explicit proxy, meaning that the proxy uses its own network address to connect to at least one connection (the client or the server) the connection must be explicitly configured to connect to the proxy. For example, in FIG. 1A proxy 102, acting as an explicit proxy, requires that every client 104, 106 must be explicitly configured to connect to proxy 102. Typically a configuration setting in client 104, 106 must be manually set to reflect a network address of the proxy 102. Requiring a configuration for every connection is very problematic for large-scale networks.

Similarly, when a firewall 112 is placed between the clients 102, 104 and server 108, so the firewall 112 can inspect all inbound and outbound traffic, as seen in FIG. 1B, client configuration is required. The clients 104 and 106 must still be configured to know about proxy 102; otherwise, traffic will just pass though the firewall 112 and completely ignore proxy 102. A firewall is a special type of router that enforces security policies when moving packets from one network to another. In contrast, in a transparent proxy arrangement, no configuration change is needed at the client side.

Another problem arises in the approaches of FIG. 1A and FIG. 1B when proxy 102 uses its own network address to access server 108. For example, proxy 102 receives two connections, one from client 104 and the other from client 106. As a result, the server 108 sees two requests from a single host proxy 102. The process performed by the proxy 102 is similar in effect to performing PAT (Port Address Translation). PAT is described further in "Configuring Network Address Translation and Static Port Address Translation to Support an Internal Web Server," document ID 12095, from Cisco Systems, Inc., San Jose, Calif. A PAT policy in many cases contradicts with other explicit NAT (Network Address Translation) policies that a user would have configured. A PAT policy also potentially creates problems for other firewall, quality of service, and virtual private network devices that are deployed between the proxy and the server.

When a router or firewall is deployed in "virtual mode," which means it simulates multiple virtual or logical devices on a single hardware device, it often puts great contraints on how/where the explicit proxy 102 should be deployed. For example, assume user designs a virtual router/firewall between network-1 and network-2, and another one between network-3 and network-4. The physical device may classify a network packet to the proper virtual router/firewall by its receiver interface, NAT configuration, and destination MAC, etc. When an explicit proxy is to be deployed for all traffic, user would face a tough design issue on where to put it. Assume he creates a network-5 to host the proxy, he would have traffic from network-1<->network-5<->network-2, and network-3<->network-5<->network-4. This creates two issues. First the original segregated traffic (network-1<->network-2, and network-3<->network-4) are now being mixed in network-5. Secondly packets are now traversing 2 network boundaries, e.g. network-1 to network-5, then network-5 to network-2, each boundary needs its own virtual router/firewall which means user has to double the number of virtual router/firewall configured on his device.

In many cases valuable stream-based applications such as file-based anti-virus scanning cannot be enabled due to the PAT policy. For example, a packet upon arrival at a router is classified into a connection based on information such as the receiver interface, NAT configuration, and destination MAC addresses. Based on the packet classification, the router retrieves the security policy configured for that specific combination of values. If the packet is then diverted to a proxy 102 for processing at a proxy application, under standard IP routing approaches the router cannot re-classify a packet received back from the proxy since the original information used to classify the packet has been discarded at the proxy or proxy application. Thus once the packet is injected back from the proxy, the valuable classification by router 112 is lost.

One prior approach merges the network nodes, such as routers, and proxy application into one machine. In this approach the proxy application is compiled into an existing network node's operating system. However, in many cases the network node's operating system is configured such that it is difficult to incorporate an application software on top of the operating system, thus requiring extensive modification to the software in order to make it compatible with the operating system. Furthermore, by incorporating the operating system with routing logic and proxy application into one machine, all such elements must share CPU time and memory, potentially causing resource starvation. It is much more efficient and beneficial to keep these two components separate.

Another approach used to avoid the re-classification problem resulting from PAT involves a transparent proxy. In a transparent proxy the client is unaware of the proxy and always addresses packets to the server. The proxy intercepts and spoofs the connection. When the proxy connects to the server, the proxy spoofs the client's IP address and port values. Thus none of the client's information is lost upon transfer. Referring to FIG. 1A for illustration purposes, the server will receive one connection coming from client 104 and another connection coming from client 106. The proxy is "invisible" to both the client and the server.

However, in many situations the proxy and proxy application are configured such that they are explicitly set to be an explicit proxy, or require, at minimum, the use of the proxy's IP address for at least one connection, therefore preventing transparency.

BRIEF DESCRIPTION OF THE DRAWINGS

FIG. 3A, FIG. 3B illustrate a method of establishing a complete end-to-end connection between a client and a server using the proxy approach introduced herein.

DETAILED DESCRIPTION

Figure 1A:
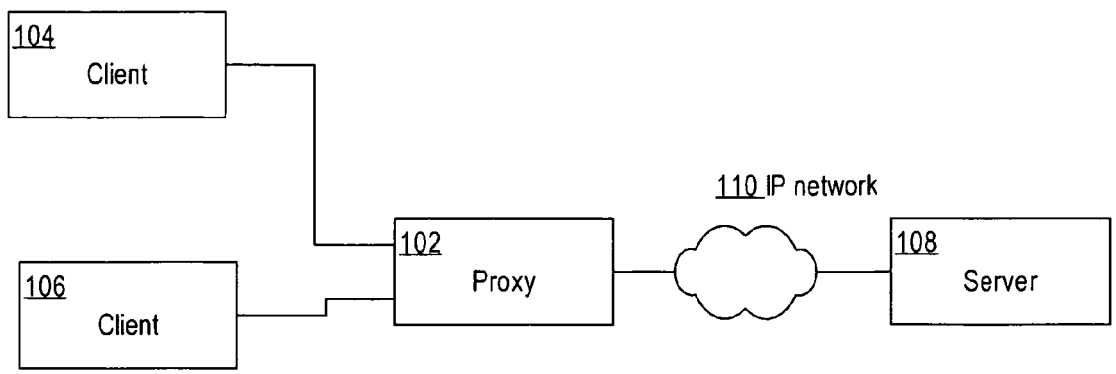
FIG. 1A is a block diagram that illustrates typical network context in which a proxy is an intermediary between a client and a server.
Figure 1B:
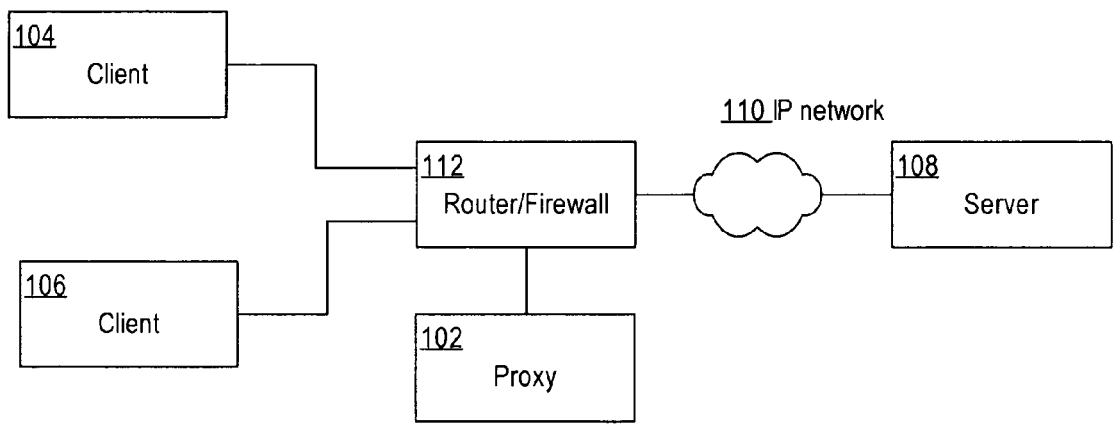
FIG. 1B is a block diagram that illustrates typical network context in which a router and a proxy are intermediaries between a client and a server.

A method and system are disclosed for collaboration between a router and a proxy in order to transparently proxy a connection between a client and server. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Embodiments are described herein according to the following outline:
 1.0 General Overview
 2.0 Structural and Functional Overview
  2.1 Three-way handshake
  2.2 Transparent proxy of network connection
 3.0 Implementation Mechanisms—Hardware Overview
 4.0 Extensions and Alternates
1.0 General Overview The needs identified in the foregoing Background, and other needs and objects that will become apparent for the following description, are achieved in the present invention, which comprises, in one aspect, a method for establishing a collaboration between a router and a proxy in order to transparently proxy a connection between a client and a server comprising: receiving a first segment from the client, creating a connection state wherein the connection state is assigned a unique ID, forwarding the first segment to the proxy including additional information wherein the additional information includes the unique ID, a direction and, an assigned proxy application, receiving a second segment from the proxy wherein the second segment containing the unique ID and based on the unique ID sending a segment to the client, receiving confirmation of the second segment from the client and forwarding the confirmation to the proxy.

In another feature of this aspect, establishing a collaboration between a router and a proxy in order to transparently proxy a connection between a client and a server comprises receiving a segment from the router, creating a mapping of the segment to an IP socket based on information contained in the segment wherein the information contained in the segment includes a unique ID, a first direction and, an assigned proxy application, sending a return segment to the router wherein the segment contains the unique ID a second direction and the assigned proxy application, receiving a second segment from the router indicating confirmation by the client, and notifying the assigned proxy application that a connection between the client and the proxy has been established.

In yet another features of this embodiment a method for collaboration between a router and a proxy in order to transparently proxy a connection between a client and a server comprising: receiving a notification that a proxy connection between a client and a server has been established, receiving a segment from the client side of the proxy connection wherein the segment contains the unique ID a second direction and the assigned proxy application, performing a proxy application function on the segment, and sending the segment to the server using the unique ID a second direction and the assigned proxy application such that the segment appears to be from the client.

In yet another feature of this embodiment collaboration between a router and a proxy in order to transparently proxy a connection between a client and a server comprises receiving a segment from the server side of the proxy connection wherein the segment contains the unique ID a second direction and the assigned proxy application, performing a proxy application function on the segment, and sending the segment to the client using the unique ID a second direction and the assigned proxy application such that the segment appears to be from the server.

In yet another aspect, an embodiment generally provides for collaboration between a router and a proxy in order to transparently proxy connections between a client and server. In one feature, an embodiment provides for collaboration for transparently proxy connection wherein the proxy is unaware of the transparency.

In one respect, an embodiment provides a process that combines elements of a router and an explicit proxy to provide transparent full proxy function at a system level with minimum changes to either the router or the explicit proxy. In this aspect, a router-side process comprises a router creating a connection state to describe the end-to-end connection between the client and server, assigning an unique ID to the connection state, receiving segments from either client or server, forwarding them to the proxy according to an protocol agreed upon between the router and the proxy wherein router connection ID, direction (from client to server or server to client), and a proxy application ID are attached to each segment, receiving segments from the proxy according to the same protocol, stripping off the additional information before forwarding the segments to their intended destination (i.e. either the client or the server) based on router connection ID, direction and proxy application ID.

A proxy OS process that can interact with the router-side process comprises the proxy creating two connection states, one to describe the connection between the client and the proxy, the other to describe the connection between the proxy and the server; receiving segments from the router, classifying the segments to corresponding connection state by leveraging the router connection ID, direction and proxy application ID attached to each segment by the router, sending segments to the router without modifying the network address of either the client or the server (i.e. the proxy is transparent), tagging the segments using the previously mentioned protocol to attach router connection ID, direction, and proxy application ID to each segment.

A proxy application process comprises the proxy application reading data from both connections, scanning or modifying data as needed (like scanning for virus), and writing data to both connections as appropriate. In one aspect, the proxy application does not have to be aware of the transparency which is hidden within the Proxy OS.

In other aspects, the invention provides a computer-readable medium and apparatus configured to perform the preceding steps. Other features and aspects will become apparent from the following description.

2.0 Structural and Functional Overview

Figure 2:
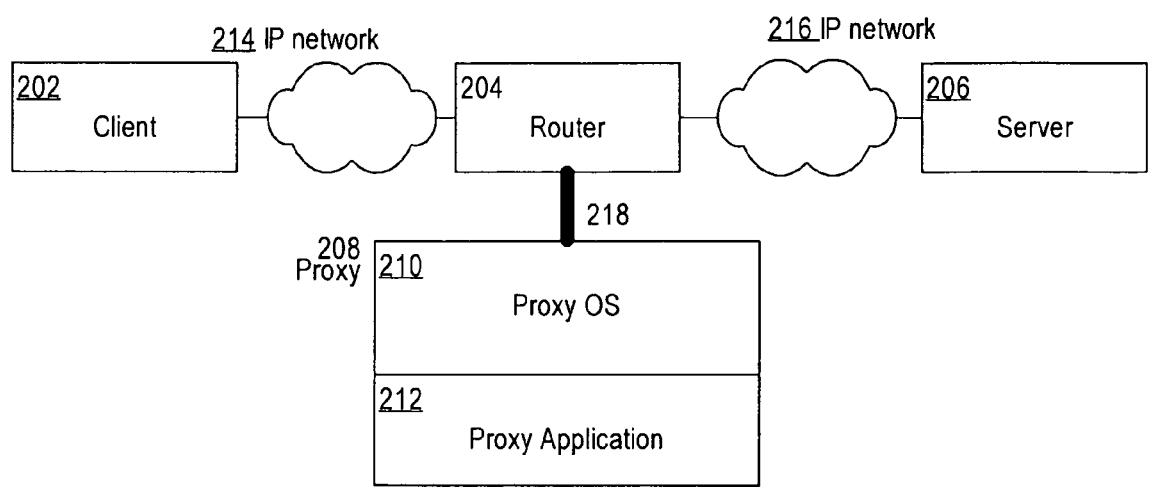
FIG. 2 is a block diagram that illustrates an example network context in which an implementation may be embodied.

FIG. 2 illustrates an example network context that may be used to implement an embodiment. In FIG. 2, a client 202 in a first IP network 214 is communicatively coupled to a router 204. The router 204 is coupled to a server 206 within another IP network 216. Router 204 and a proxy machine 208 are connected through a network link 218. The proxy machine 208 comprises an operating system 210 (herein referred to as the proxy OS) and one or more proxy applications 212. Router 204 as described herein collaborates with the proxy machine 208 to transparently proxy the TCP connection between the client 202 and the server 206.

Router 204 and proxy machine 208 communicate using a messaging protocol. In one embodiment, an ASA Service module Data plane Protocol (ASDP) is implemented in order for communication and collaboration between the router 204 and the proxy machine 208. ASDP defines the protocol by which the router 204 and proxy machine 208 exchange packets. In one embodiment, an ASDP packet header includes an identifier of the connection to which a packet belongs, a value identifying the direction of travel of the packet (client to server or server to client), and a value identifying the proxy application that is responsible for the packet. Other embodiments may use any other messaging mechanism that carries a connection identifier, direction identifier, and application identifier. In one embodiment, ASDP header and the standard five-tuple of packet identifying values (source network address, destination network address, source port value, destination port value, and protocol identifier) are used in combination as a key by the Proxy OS to create and define sockets for connections to the client and server.

2.1 Three-Way Handshake to Establish the Transparent Connection

In one embodiment a transparent proxy is configured to perform a three-way handshake with a client in order to establish a new transport connection, as if the client is performing a conventional three-way handshake with a server. In one embodiment, the transport protocol connection is established according to Transport Control Protocol (TCP) as defined in IETF RFC 793; however, in other embodiments, different transport protocols may be used. In a typical TCP implementation when a system (such as a client) attempts to establish a TCP connection to a system providing a service (such as a server), the client and server exchange a sequence of segments called a three-way handshake.

In a conventional TCP three-way handshake the client begins by sending a SYN segment to the server. A TCP SYN segment is a segment in which the TCP header has the SYN bit set on, which lets the receiver know that the sender wants to establish a TCP-based connection. The server then acknowledges the SYN segment by sending SYN-ACK segment to the client. The client then finishes establishing the connection by responding with an ACK segment. The connection between the client and the server is then open, and the service-specific data can be exchanged between the client and the server.

Figure 3A:
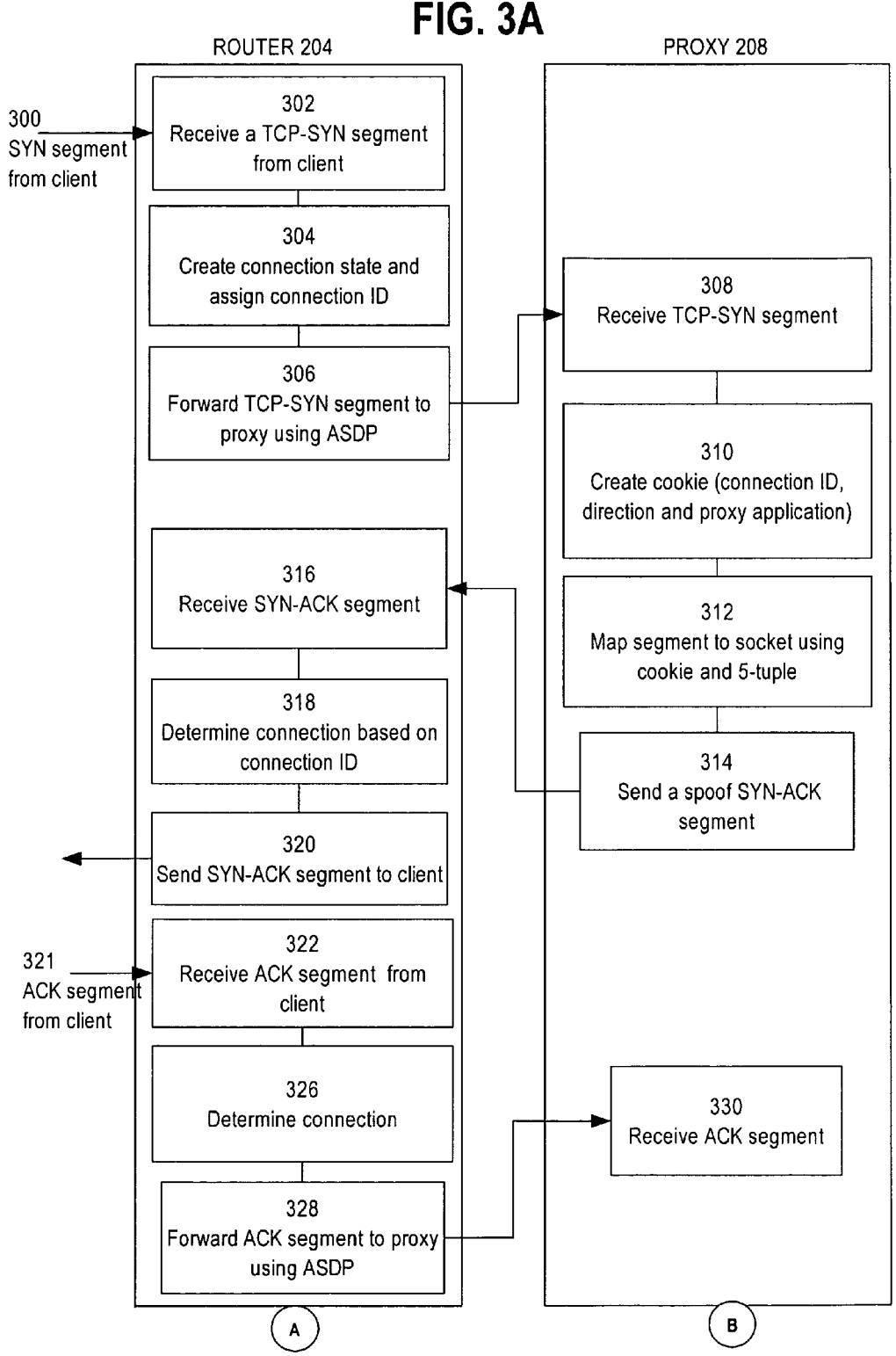

FIG. 3A, FIG. 3B illustrate a method of establishing a compete end to end connection between a client and a server according to one embodiment of the proxy approach herein. A complete end-to-end connection consists of two parts. The first part comprises a connection between the client and the proxy and the second part comprises a connection between the proxy and the server. For purposes of illustrating a clear example, the description of FIG. 3A, FIG. 3B assumes that a client, router, proxy and server are communicatively coupled in the arrangement of FIG. 2. In FIG. 3A, a client 202 sends a SYN segment 300 towards server, and when the router 204 receives the TCP SYN segment from the client 202 at step 302, the router 204 creates a connection state data structure and assigns the connection a unique identifier, as shown in step 304. Step 304 may also involve creating and storing, in the router 204, a table that maps connection data to connection identifiers to facilitate later lookup.

The router 204 then forwards the TCP SYN packet to the proxy machine 208 at step 306, using a communication protocol adapted for router-proxy communications, such as ASDP. In one embodiment, an ASDP message sent at step 306 includes: the connection ID, a direction value (indicating for this message a direction from client to server), and an identifier of the proxy application 212. In one embodiment, the connection ID, direction value, and application ID are carried in the header of the ASDP message. In one embodiment, the direction value is a flag bit that is set in the header. Further, in one embodiment, use of an application ID enables a router to distinguish among a plurality of different proxy applications 212 that are hosted at proxy machine 208. Examples of different proxy applications 212 include an anti-virus application, a bulk mail detection application, a policy compliance application, a message format conversion or transformation application, a security posture validation application, etc. The particular proxy application 212 is not critical and various embodiments may use any desired proxy application.

At step 308 the TCP-SYN segment is received in the ASDP message at proxy 208. The proxy operating system (OS) 210 upon receiving the TCP SYN segment combines the connection ID, the direction and the proxy application ID to generate a cookie, as shown in step 310. The proxy OS 210 stores the cookie in a table together with the five-tuple of values identifying a connection (protocol, source IP, source port, destination IP, destination port), and the table maps the values of the cookie and five-tuple to a TCP/IP socket identifier, as shown at step 312. Thus, in later steps, a TCP/IP socket identifier can be used to uniquely identify all values associated with a connection and the processing of segments at the proxy application.

At step 314, the proxy machine 208 spoofs a SYN-ACK segment directed to the client, and sends the spoofed segment back to the router 204. In one embodiment, a TCP/IP stack of proxy OS 210 or proxy machine 208 performs step 314. A SYN-ACK segment acknowledges that a server received an initial SYN segment. In an embodiment, the ASDP header of the spoofed SYN-ACK segment of step 314 has the same connection ID and application ID values as the SYN segment received at step 308, but the direction value is reversed to indicate that the SYN-ACK segment of step 314 is directed from the server 206 to the client 202.

At step 316, the SYN-ACK segment is received at the router 204, extracted from the ASDP message. The router 204, upon receiving the SYN-ACK segment, looks up the existing connection among existing connection state data structures using the connection ID, as shown in step 318. The router 204 then sends the packet to the client, at step 320. The client replies to the SYN-ACK segment by sending out an ACK segment, at step 321, which is received at the router 204 and handled similarly as the previous SYN segment in steps 322, 326 and 328. The ACK segment acknowledges that the client has received the previous SYN-ACK segment. Once the proxy 208 has received the ACK segment at step 330, the three-way handshake with the client is complete and both the router 204 and the proxy 208 have acquired information uniquely identifying the connection.

Once the three-way handshake among the client, router and proxy is complete, the proxy 208 also completes a similar three-way handshake with the server 206. FIG. 3B illustrates steps to perform connection setup between the proxy 208 and server 206. The handshake with the server is performed by the same general steps as in the handshake with the client 202, as shown in steps 332 to 354, inclusive, with the exception of one additional feature.

In one embodiment, for every end-to end logical connection between the client and the server, proxy 208 creates two sockets to transparently proxy the connection. The first socket is associated with a connection of the client, router and proxy as discussed above in step 312, and the second socket identifies a connection of the server, router and proxy.

In one embodiment, creating a server side socket is performed by the proxy application reading from the client side socket connection (established in step 312), and creating a connection to the server 206 through a new socket by transferring the cookie from client side socket to the server side socket. This step ensures that proxy 208 has a mapping of the TCP connection to both the client side and the server side.

The proxy OS then spoofs messages to or from the client by binding the server socket to the client's IP address and port values which are used in the client side socket. The two sockets are associated with the same five-tuple of values that defines a TCP connection, i.e., a protocol identifier indicating TCP, the IP address of client 202 as source IP, the port value of client 202 as source port, the IP address of server 206 as destination IP, and the port value of server 206 as destination port. However, proxy OS 210 can distinguish among the sockets by using the direction information in the cookie as described above.

The SYN packet that is sent toward the server in step 336 (FIG. 3B) is identical to the SYN segment that is received from the client in step 300 (FIG. 3A) with respect to the five-tuple of values that identifies a TCP connection. In the approach herein, the end effect is that the client manages a single connection to the server; the server manages a single connection to the client; the router manages a single connection between client and server; and the proxy manages two connections, one with the client and one with the server. Thus, the approach herein provides a collaborative process that coalesces the two connections on the prodxy into a single connection on the router.

Based on the information established in the preceding approach, in proxy 208 segments coming from the client to the server are mapped to the client side socket, and segments directed from the server to the client are mapped to the server side socket. The proxy OS 210 then sends a SYN segment to the router 204 with a connection ID in the ASDP header indicating that the segment is for the server 206. Similar to the client side connection setup described above, the server 206 responds with a SYN-ACK segment, which is diverted to the proxy machine 208, which in turn sends an ACK segment to complete the three-way handshake.

2.2 Transparent Proxy of TCP Connections

Figure 4:
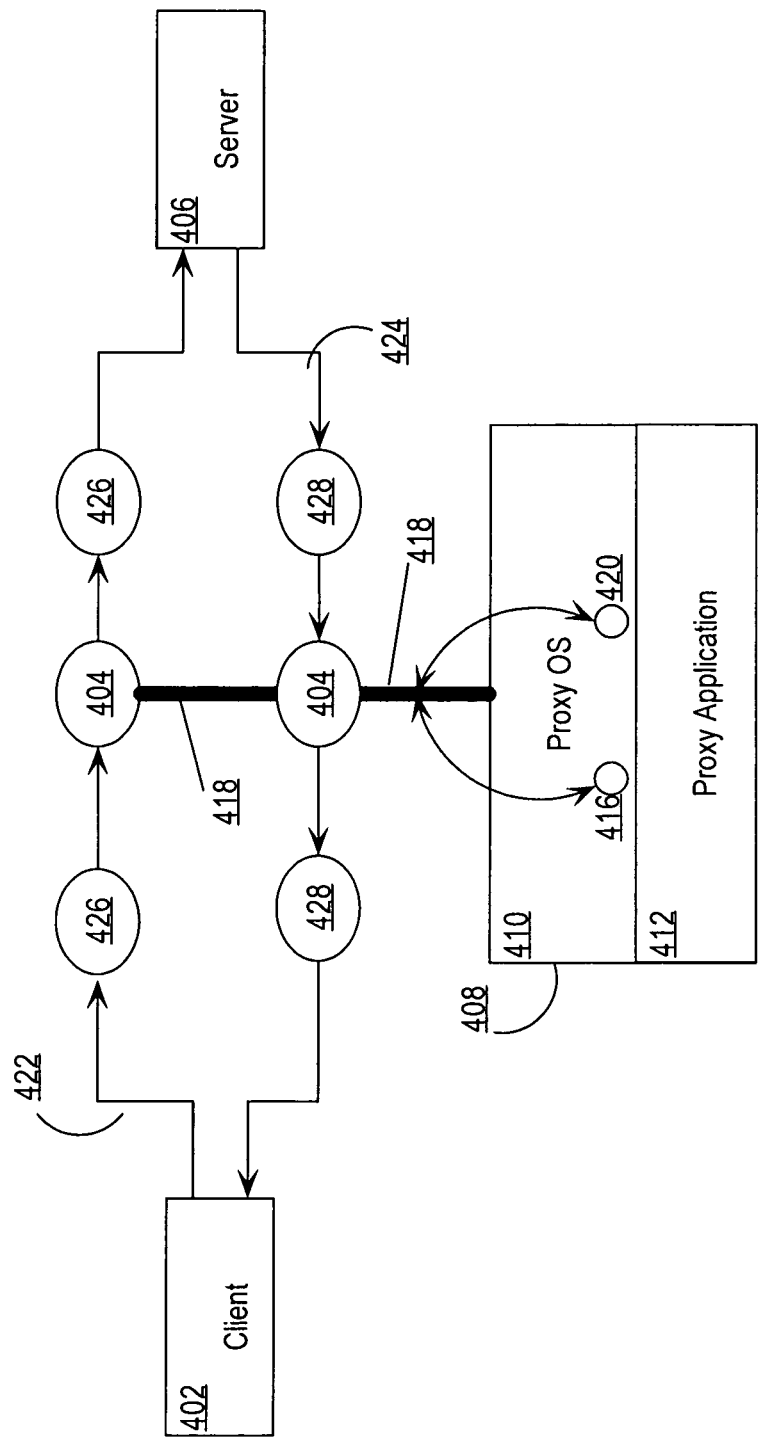
FIG. 4 illustrates one embodiment of a network context and socket connections as used in an embodiment.

Once both three-way handshakes are complete, the proxy machine 208 then can transparently intercept messages between the client and the server so that the proxy application can process the messages or take other desired action. FIG. 4 is a block diagram of an embodiment of a network context and socket connections with which implementations may be used. A router 404 and the proxy machine 408 are connected though a network link 418. The proxy machine 208 comprises proxy OS 410 and one or more proxy applications 412.

Router 404 is communicatively coupled between client 402 and server 406. Router 404 is logically positioned in a sending path 422 and receiving path 424 between client 402 and server 406. Sending path 422 may include one or more other routers 426 and receiving path 424 may include one or more other routers 428. Router 404 may be positioned either before or after any of the routers 426, 428.

The router 404 collaborates with the proxy machine 408 to transparently proxy the TCP connection of client 402 and server 406 using sockets 416 and 420. Sockets 416 and 420 are created using the three-way handshake process as described above. Each socket 416, 420 in the proxy machine 408 is mapped to a TCP connection using the cookie (consisting of connection ID, the direction value and the proxy application identifier) that was established during the three-way handshake. Socket 416 transparently connects the proxy machine 408 to the client 402 and socket 420 transparently connects the proxy machine 408 to server 406.

Figure 5:
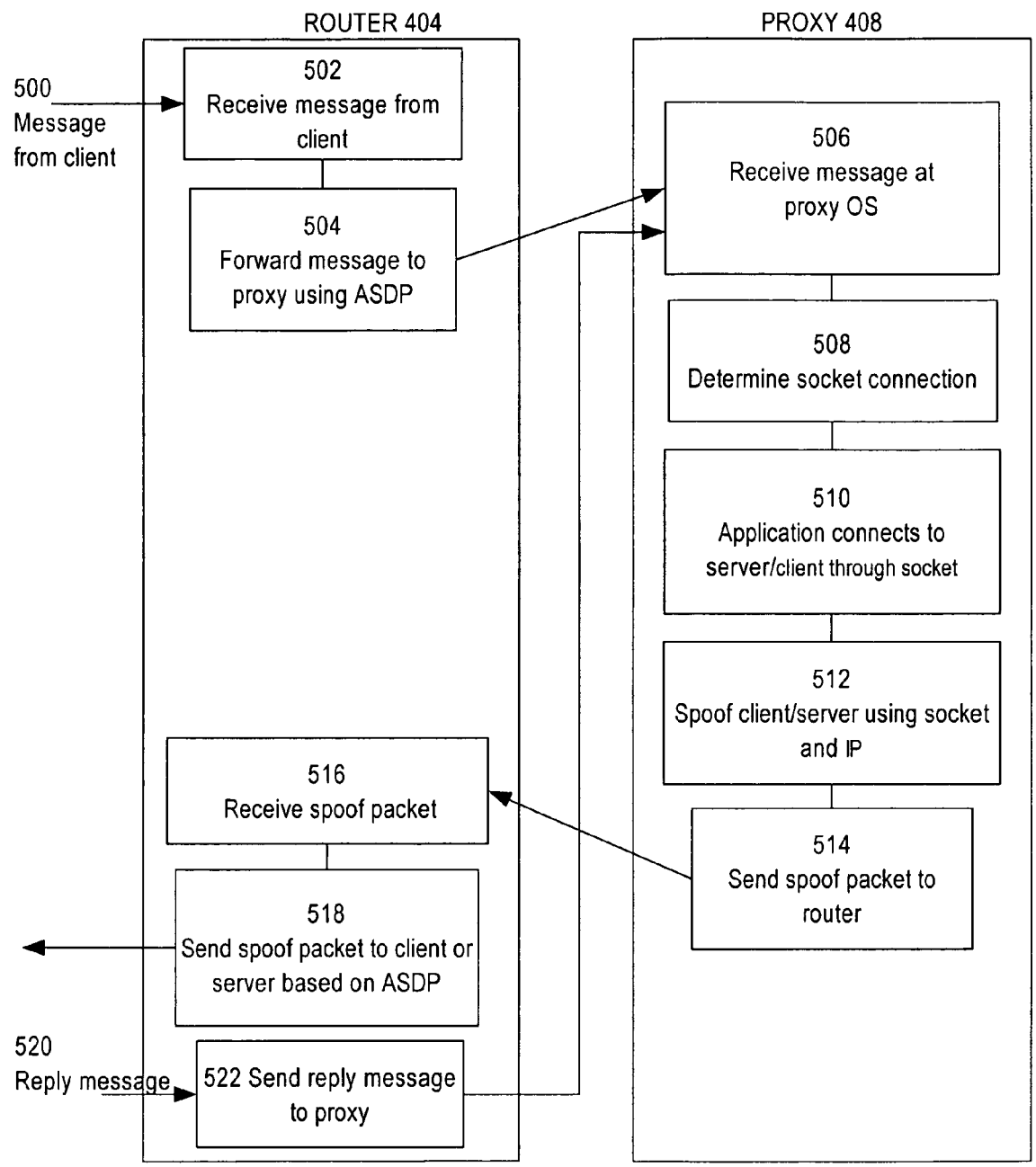
FIG. 5 illustrates a method of collaboration between a router and proxy in order to transparently proxy communications according to one embodiment.

FIG. 5 illustrates an example embodiment of transparent proxying of TCP connections. For purposes of illustrating a clear example, FIG. 5 is described herein with reference to the network arrangement of FIG. 4. However, in other embodiments the general approach of FIG. 5 may be used in many other network arrangements. In step 502, the router 404 receives a TCP segment from the client 402. The router 404 forwards the TCP segment using ASDP or a similar messaging protocol, at step 504. Upon receiving a TCP segment from the router 402, at step 506, the proxy OS 410 determines the appropriate socket connection based on the ASDP header, as shown at step 508. The assigned proxy application 412 (indicated by the application identifier in the ASDP header) reads from the socket connection at step 510, and at a certain point the application 412 may need to initiate a connection to the server 406. The proxy machine 408 connects to server 406 through socket 420, which has the corresponding cookie from client side socket 416.

The proxy OS 410 then spoofs packets to or from the client 402 by binding the server socket 420 to the client's IP address and port values, which are used in the client side socket 416, at step 512. The proxy 408 then sends the spoofed packet back to the router at step 514. The router 404 determines, based on the direction value in the ASDP header, which direction the packet is going and injects the spoofed packet to the client or the server. This process repeats itself for all TCP segments passed along the connection.

The two sockets are associated with the same five-tuple of values that defines a TCP connection, i.e., a protocol identifier indicating TCP, the IP address of the client as source IP, the port value of the client as source port, the IP address of the server as destination IP, and the port value of the server as destination port. However, proxy OS 410 can distinguish among the sockets by using the direction information in the cookie as described above.

Packets coming from the client to the server are mapped to the client side socket 416, and packets from the server to the client are mapped to the server side socket 420. The proxy OS 410 then sends the packets to the router 404 with a connection ID in the ASDP header, and a direction bit indicating a packet for the server 406. Similar to client side communications, packets from the server are diverted to the proxy machine 408. All connection data and FIN segments are proxied in the same way.

In this embodiment, there is minimum change needed for the proxy application 412 to process packets or segments that are intercepted in the communication paths between the client and the server. The application 412 is still using two sockets to communicate with the client and the server independently, which is conventional practice for many applications. Thus, embodiments can interoperate with previously developed applications without requiring extensive modifications to the applications. The only requirement is that an application reads and writes data using different sockets.

From the router's point of the view, all the packets to either client or server still belong to a single connection. They share the same five-tuple of TCP/IP attributes. Further, the approach herein is allows the router to use multiple transparent proxies in the same data path.

Since the proxy is transparent in the approach herein, there is no need to make changes to the software and/or configuration on an end host or client. This embodiment can use other services provided by routers such as NAT, AAA (Authentication, Authorization, and Accounting), Virtual Firewalls, Transparent Firewalls, etc.

3.0 Implementation Mechanisms—Hardware Overview

Figure 6:
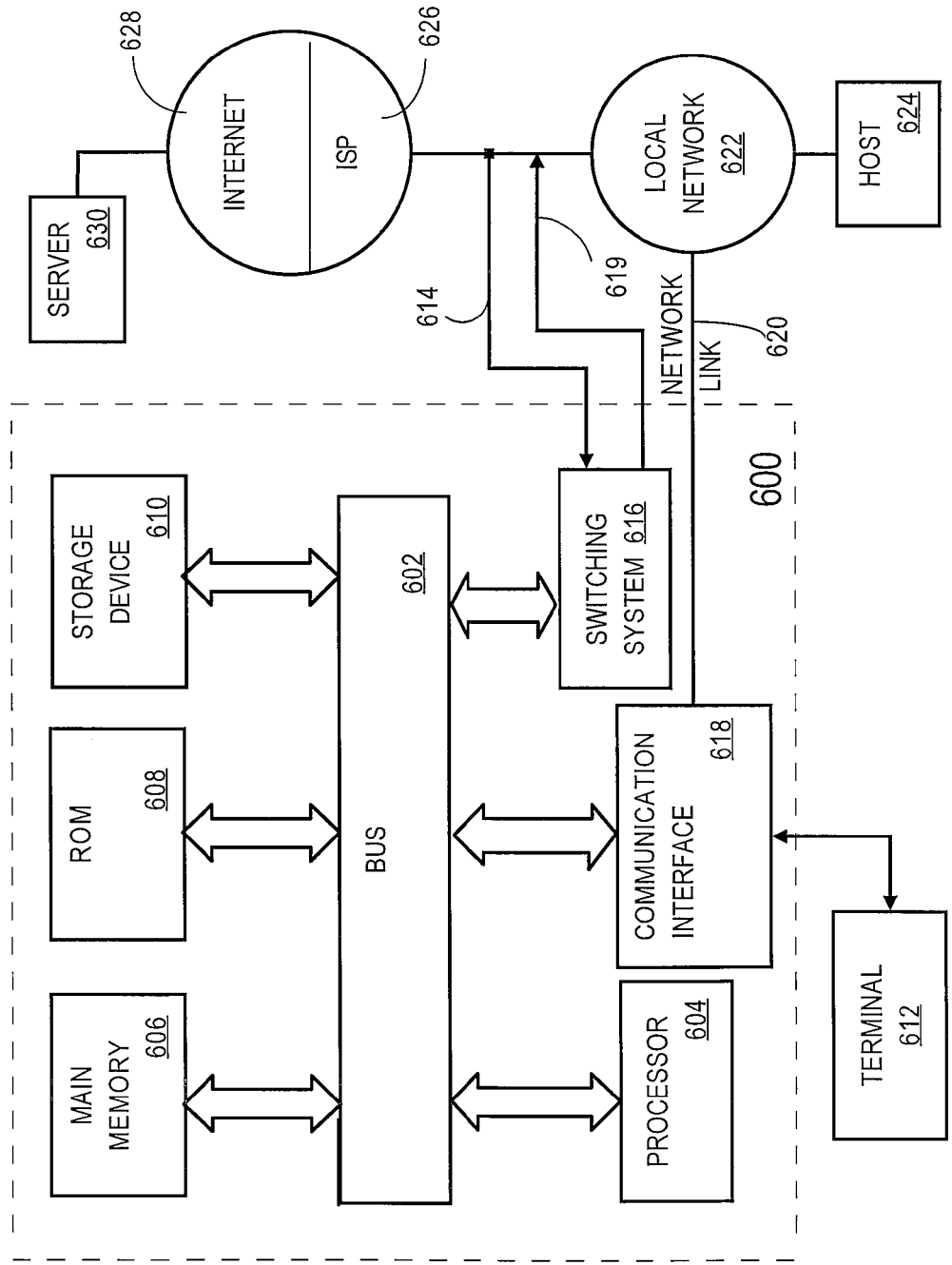
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-322 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for QoS and fault isolation in BGP traffic, address families and routing topologies as described herein The received code may be executed by processor 604 as it is received, and/or stored in storage device 610, or other non-volatile storage for later execution. In this manner, computer system 600 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing data packets using a router and a proxy comprising:
    the router receiving, from a client device, a first data segment associated with a transport protocol connection;
    wherein the transport protocol connection is a Transmission Control Protocol (TCP) connection;
    wherein the first data segment is sent from the client device to a server through the router;
    the router determining a connection identifier from a mapping of the TCP connection to the connection identifier and to a plurality of values that identify a source, a destination, and the TCP protocol;
    the router sending the first data segment to the proxy in a first message that comprises the connection identifier, a first direction value, and an identifier of a proxy application that is hosted in the proxy;
    wherein the first message conforms to a protocol for exchanging messages between the router and the proxy, and wherein the first direction value included in the first message indicates to the proxy a socket to which the first data segment is to be written;
    the router receiving from the proxy a second message that comprises a response data segment, wherein the second message further comprises the connection identifier, the first direction value, and the identifier of the proxy application;
    wherein the response data segment is generated at the proxy in response to the first data segment based in part by the proxy processing the first data segment using the proxy application;
    wherein the first data segment and the response data segment are TCP segments;
    wherein the second message conforms to the protocol for exchanging messages between the router and the proxy, and wherein the first direction value included in the second message indicates to the router in which direction on the TCP connection the response data segment is to be forwarded;
    based on the first direction value included in the second message, the router determining that the response data segment is to be forwarded to the server in a first direction from the client device to the server;
    the router forwarding the response data segment to the server based on the mapping.

2. The method of claim 1 wherein the router sending said first data segment to the proxy further comprises creating a packet having a header and a payload that encapsulates the first data segment, wherein the header includes the connection identifier, the first direction value, and the identifier of the proxy application.

3. The method of claim 1 wherein the mapping further comprises the first direction value and the identifier of the proxy application.

4. The method of claim 1, further comprising, prior to receiving the first data segment, the router performing the steps of:
    receiving from the client device a first connection initialization segment to initialize the TCP connection;
    the router creating a connection state data structure and assigning the connection identifier to the connection state data structure;
    wherein the connection state data structure further includes the mapping of the TCP connection to the connection identifier and to the plurality of values that identify the source, the destination, and the TCP protocol;
    the router forwarding the first connection initialization segment to the proxy in a third message that comprises the connection identifier, the first direction value, and the identifier of the proxy application;
    the router receiving from the proxy a fourth message that includes a second connection initialization segment, wherein the fourth message further includes the connection identifier and a second direction value, and wherein the second connection initialization segment comprises an acknowledgment by the proxy of the first connection initialization segment;
    wherein the second direction value identifies a second direction from the sever to the client device;
    based on the connection identifier and the second direction value included in the fourth message, the router sending the second connection initialization segment on the TCP connection in the second direction to the client device;
    the router receiving confirmation of the second connection initialization segment from the client device and forwarding the confirmation to the proxy.

5. The method of claim 4, wherein the third message encapsulates the first connection initialization segment and wherein the connection identifier, the first direction value, and the identifier of the proxy application are carried in a header of the third message and the first connection initialization segment is carried in a payload of the third message.

6. The method of claim 1, wherein the proxy application comprises any one of an anti-virus application, a bulk mail detection application, a policy compliance application, a message format conversion or transformation application, and a security posture validation application.

7. An apparatus comprising:
one or more processors;
a computer-readable storage medium coupled to the one or more processors and storing one or more sequences of instructions which, when executed by the one or more processors cause the one or more processors to perform:
  receiving, from a client device, a first data segment associated with a transport protocol connection;
  wherein the transport protocol connection is a Transmission Control Protocol (TCP) connection;
  wherein the first data segment is sent from the client device to a server through the apparatus;
  determining a connection identifier from a mapping of the TCP connection to the connection identifier and to a plurality of values that identify a source, a destination, and the TCP protocol of the connection;
  sending the first data segment to a proxy in a first message that comprises the connection identifier, a first direction value, and an identifier of a proxy application that is hosted in the proxy;
  wherein the first message conforms to a protocol for exchanging messages between the apparatus and the proxy, and wherein the first direction value included in the first message indicates to the proxy a socket to which the first data segment is to be written;
  receiving from the proxy a second message that comprises a response data segment, wherein the second message further comprises the connection identifier, the first direction value, and the identifier of the proxy application;
  wherein the response data segment is generated at the proxy in response to the first data segment based in part by the proxy processing the first data segment using the proxy application;
  wherein the first data segment and the response data segment are TCP segments;
  wherein the second message conforms to the protocol for exchanging messages between the apparatus and the proxy, and wherein the first direction value included in the second message indicates to the apparatus in which direction on the TCP connection the response data segment is to be forwarded;
  based on the first direction value included in the second message, determining that the response data segment is to be forwarded to the server in a first direction from the client device to the server;
  forwarding the response data segment to the server based on the mapping.

8. The apparatus of claim 7 wherein the instructions for sending said first data segment to the proxy further comprise instructions for creating a packet having a header and a payload that encapsulates the first data segment, wherein the header includes the connection identifier, the first direction value, and the identifier of the proxy application.

9. The apparatus of claim 7 wherein the mapping further comprises the first direction value and the identifier of the proxy application.

10. The apparatus of claim 7, wherein the one or more sequences of instructions further comprise instructions which, when executed by the one or more processors cause the one or more processors to perform, prior to receiving the first data segment, the steps of:
  receiving from the client device a first connection initialization segment to initialize the TCP connection;
  creating a connection state data structure and assigning the connection identifier to the connection state data structure;
  wherein the connection state data structure further includes the mapping of the TCP connection to the connection identifier and to the plurality of values that identify the source, the destination, and the TCP protocol;
  forwarding the first connection initialization segment to the proxy in a third message that comprises the connection identifier, the first direction value, and the identifier of the proxy application;
  receiving from the proxy a fourth message that includes a second connection initialization segment, wherein the fourth message further includes the connection identifier and a second direction value, and wherein the second connection initialization segment comprises an acknowledgment by the proxy of the first connection initialization segment;
  wherein the second direction value identifies a second direction from the sever to the client device;
  based on the connection identifier and the second direction value included in the fourth message, sending the second connection initialization segment on the TCP connection in the second direction to the client device;
  receiving confirmation of the second connection initialization segment from the client device and forwarding the confirmation to the proxy.

11. The apparatus of claim 10, wherein the third message encapsulates the first connection initialization segment and wherein the connection identifier, the first direction value, and the identifier of the proxy application are carried in a header of the third message and the first connection initialization segment is carried in a payload of the third message.

12. The apparatus of claim 7, wherein the proxy application comprises any one of an anti-virus application, a bulk mail detection application, a policy compliance application, a message format conversion or transformation application, and a security posture validation application.

13. A method of processing data packets using a router and a proxy in a packet-switched network, the method comprising:
  the proxy receiving from the router a first message that includes a first connection initialization segment;
  wherein the first message conforms to a protocol for exchanging messages between the router and the proxy;
  wherein the first connection initialization segment is sent from a client device to a server through the router, and wherein the first connection initialization segment initializes a transport protocol connection between the client device and the server;
  wherein the transport protocol connection is a Transmission Control Protocol (TCP) connection;
  the proxy creating a mapping of the first connection initialization segment to a first socket value based on information included in the first message, wherein the first message includes a connection identifier of the TCP connection, a first direction value, and an identifier of a particular proxy application among one or more proxy applications that are hosted in the proxy;
  wherein the proxy creating the mapping comprises determining the first socket value based at least in part on the first direction value included in the first message, wherein the first direction value identifies a first direction on the TCP connection from the client device to the server;
  the proxy creating and sending to the router a second message that includes a second connection initialization segment, wherein the second connection initialization segment acknowledges the first connection initialization segment, and wherein the second message includes the connection identifier, a second direction value that is different from the first direction value, and the identifier of the particular proxy application;
wherein the second message conforms to the protocol for exchanging messages between the router and the proxy;
wherein the first connection initialization segment and the second connection initialization segment are TCP segments;
wherein the second direction value identifies a second direction on the TCP connection from the server to the client device;
wherein the second direction value included in the second message causes the router to determine that the second connection initialization segment is to be forwarded to the client device in the second direction on the TCP connection; and
the proxy receiving a confirmation connection initialization segment from the router.

14. The method of claim 13, further comprising the proxy processing the first connection initialization segment using the particular proxy application.

15. The method of claim 13, wherein the proxy creating the mapping further comprises:
creating a cookie based on the connection identifier, the first direction value, and the identifier of the particular proxy application that are included in the first message; and
using the cookie in creating keys for a socket associated with the first socket value.

16. The method of claim 13, wherein the first message comprises a header comprising the connection identifier, the first direction value, and the identifier of the particular proxy application.

17. The method of claim 13, wherein the particular proxy application comprises any one of an anti-virus application, a bulk mail detection application, a policy compliance application, a message format conversion or transformation application, and a security posture validation application.

18. The method of claim 13, further comprising:
the proxy receiving from the router a third message that includes a first data segment, wherein the third message further includes the connection identifier, the second direction value, and the identifier of the particular proxy application;
the proxy determining a second socket value based at least in part on the second direction value included in the third message;
the proxy processing the first data segment using the particular proxy application, to result in creating a second data segment, by reading from a socket that is identified by the second socket value, wherein the socket corresponds to the connection identifier, the second direction value, and the identifier of the particular proxy application;
the proxy sending the second data segment to the router in a fourth message that includes the connection identifier, the second direction value, and the identifier of the particular proxy application.

19. The method of claim 18, wherein the proxy sending the second data segment to the router further comprises creating the fourth message that encapsulates the second data segment in a payload and that comprises a header that includes the connection identifier, the second direction value, and the identifier of the particular proxy application.

20. The method of claim 18, wherein the proxy sending the second data segment to the router further comprises sending the second data segment through the same socket that is used to process the first data segment.

21. An apparatus comprising:
one or more processors;
a computer-readable storage medium coupled to the one or more processors and storing one or more sequences of instructions which, when executed by the one or more processors, cause the one or more processors to perform:
executing an operating system that is operable as a proxy;
receiving from a router a first message that includes a first connection initialization segment;
wherein the first message conforms to a protocol for exchanging messages between the router and the proxy;
wherein the first connection initialization segment is sent from a client device to a server through the router, and wherein the first connection initialization segment initializes a transport protocol connection between the client device and the server;
wherein the transport protocol connection is a Transmission Control Protocol (TCP) connection;
creating a mapping of the first connection initialization segment to a first socket value based on information included in the first message, wherein the first message includes a connection identifier of the TCP connection, a first direction value, and an identifier of a particular proxy application among one or more proxy applications that are hosted in the apparatus;
wherein creating the mapping comprises determining the first socket value based at least in part on the first direction value included in the first message, wherein the first direction value identifies a first direction on the TCP connection from the client device to the server;
creating and sending to the router a second message that includes a second connection initialization segment, wherein the second connection initialization segment acknowledges the first connection initialization segment, and wherein the second message includes the connection identifier, a second direction value that is different from the first direction value, and the identifier of the particular proxy application;
wherein the second message conforms to the protocol for exchanging messages between the router and the proxy;
wherein the first connection initialization segment and the second connection initialization segment are TCP segments;
wherein the second direction value identifies a second direction on the TCP connection from the server to the client device;
wherein the second direction value included in the second message causes the router to determine that the second connection initialization segment is to be forwarded to the client device in the second direction on the TCP connection; and
receiving a confirmation connection initialization segment from the router.

22. The apparatus of claim 21, wherein the computer-readable storage medium further comprises instructions which, when executed by the one or more processors, cause the one or more processors to perform processing the first connection initialization segment using the particular proxy application.

23. The apparatus of claim 21, wherein the computer-readable storage medium further comprises instructions which, when executed by the one or more processors, cause the one or more processors to perform:

creating a cookie based on the connection identifier, the first direction value, and the identifier of the particular proxy application that are included in the first message; and using the cookie in creating keys for a socket associated with the first socket value.

24. The apparatus of claim 21, wherein the first message comprises a header comprising the connection identifier, the first direction value, and the identifier of the particular proxy application.

25. The apparatus of claim 21, wherein the particular proxy application comprises any one of an anti-virus application, a bulk mail detection application, a policy compliance application, a message format conversion or transformation application, and a security posture validation application.

26. The apparatus of claim 21, wherein the computer-readable storage medium further comprises instructions which, when executed by the one or more processors, cause the one or more processors to perform:

receiving from the router a third message that includes a first data segment, wherein the third message includes the connection identifier, the second direction value, and the identifier of the particular proxy application;

determining a second socket value based at least in part on the second direction value included in the third message;

processing the first data segment using the particular proxy application, to result in creating a second data segment, by reading from a socket that is identified by the second socket value, wherein the socket corresponds to the connection identifier, the second direction value, and the identifier of the particular proxy application;

sending the second data segment to the router in a fourth message that includes the connection identifier, the second direction value, and the identifier of the particular proxy application.

27. The apparatus of claim 26, wherein the instructions that cause the one or more processors to perform sending the second data segment to the router further comprise instructions which, when executed by the one or more processors, cause the one or more processors to perform creating the fourth message that encapsulates the second data segment in a payload and that comprises a header that includes the connection identifier, the second direction value, and the identifier of the particular proxy application.

28. The apparatus of claim 26, wherein the instructions that cause the one or more processors to perform sending the second data segment to the router further comprise instructions which, when executed by the one or more processors, cause the one or more processors to perform sending the second data segment through the same socket that is used to process the first data segment.

29. A system comprising:

a network element;

a proxy coupled to the network element;

wherein the network element stores first one or more sequences of instructions which, when executed by the network element, are operable at least to:

generate and store a connection identifier for a transport protocol connection that is established between a client device and a server through the network element;

wherein the transport protocol connection is a Transmission Control Protocol (TCP) connection;

receive a first data segment that is sent on the TCP connection;

create and send a first message to the proxy, wherein the first message includes the first data segment, the connection identifier, an identifier of a proxy application that is hosted in the proxy, and first direction data that indicates whether the first data segment is sent on the TCP connection from the client device to the server or from the server to the client device;

receive a second message from the proxy, wherein the second message includes a second data segment that is generated at least in part by the proxy application processing the first data segment, wherein the second message further includes the connection identifier and second direction data that indicates whether the second data segment is to be forwarded to the client device or to the server;

wherein the first data segment and the second data segment are TCP segments;

based on the second direction data included in the second message, make a determination whether to forward the second data segment to the client device or to the server;

forward the second data segment on the TCP connection based on the determination;

wherein the proxy stores second one or more sequences of instructions which, when executed by the proxy, are operable at least to:

receive the first message from the network element;

based at least on the first direction data included in the first message, determine a particular socket of two sockets that the proxy application associates with the TCP connection between the client device and the server;

cause the proxy application to process the first data segment by writing the first data segment to the particular socket;

receive the second data segment through the particular socket from the proxy application; and generate and send the second message to the network element.

\* \* \* \* \*